Sept. 14, 1965  G. S. BARR  3,205,808

COWL DRAIN CONTROLLER

Filed Oct. 9, 1962

INVENTOR.
Gaitskill S. Barr
BY
George E. Johnson
ATTORNEY

United States Patent Office 3,205,808
Patented Sept. 14, 1965

3,205,808
COWL DRAIN CONTROLLER
Gaitskill S. Barr, Ypsilanti, Mich., assignor to General Motors Corporation, Detroit, Mich., a corporation of Delaware
Filed Oct. 9, 1962, Ser. No. 229,447
2 Claims. (Cl. 98—2)

This invention relates to compartment drains and more particularly to drain controllers in combination with compartments such as cowl compartments of automobiles.

A pair of cowl compartments for conveying ambient air to the passenger compartment of an automobile is disclosed in the United States Patent 2,852,997, granted September 23, 1958, in the names of J. D. Leslie, R. M. Fox, and E. J. Premo. Such cowl compartments trap considerable moisture either as condensate or as rain water and holes in the vehicle body work or tubes are employed to act as drains to the ground. Upon driving such vehicles into garages and parking them, the moisture subsequently continues to drain from the cowl and often to such an extent as to be highly objectionable particularly on an otherwise dry and clean floor.

An object of the present invention is to provide a drain controller installed in a compartment wall and capable of retaining moisture within the compartment under static conditions during which drippage would be objectionable and of draining moisture from the compartment under non-static conditions when drippage is acceptable.

To this end, a feature of the present invention is an inverted cup structure defining an inverted U flow path, one leg of the latter being restricted and extending upwardly from a low zone of a compartment to be drained and the other leg being large in cross section and extending downwardly through a wall of said compartment. Another feature is a cup structure defining a flow path through the bottom wall of a container such as an automobile cowl chamber, the flow path being restricted in flow capacity in extending upwardly from the vicinity of said bottom wall and having an excess in flow capacity in extending downwardly through said bottom wall.

These and other important features of the invention will now be described in detail in the specification and then pointed out more particularly in the appended claims.

Figure 1:
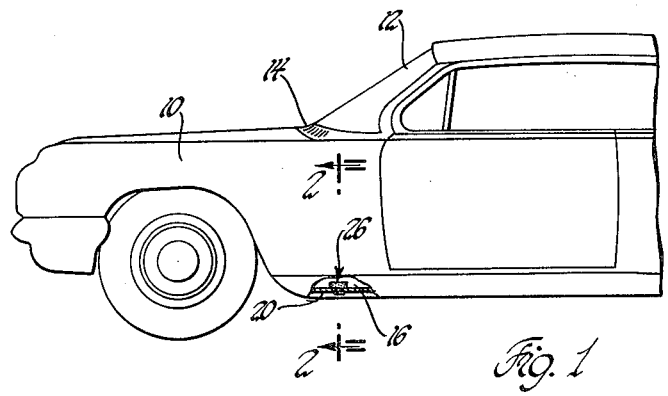
FIGURE 1 is an elevational view of the front half of an automobile, a portion being broken away better to illustrate one embodiment of the invention.
Figure 2:
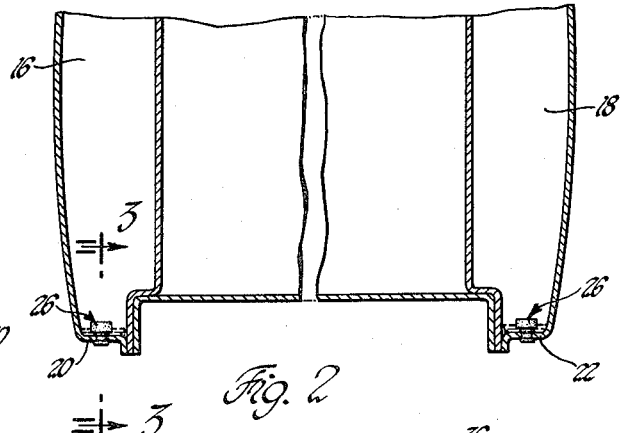
FIGURE 2 is a sectional view looking in the direction of the arrows 2—2 in FIGURE 1 and drawn to a larger scale.
Figure 3:
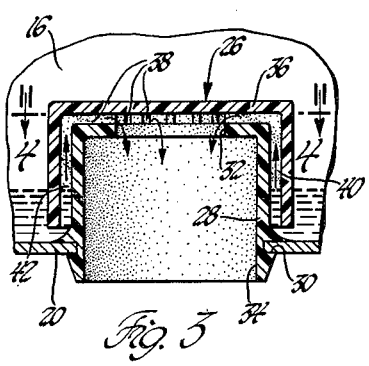
FIGURE 3 is a sectional view taken along the line 3—3 in FIGURE 2 and drawn to a larger scale.
Figure 4:
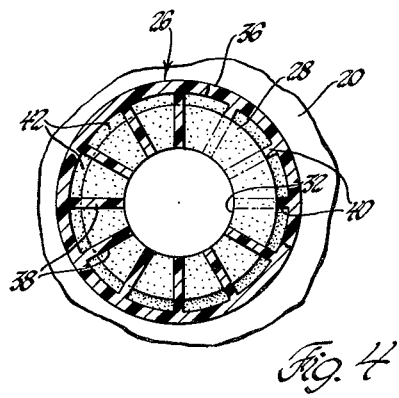
FIGURE 4 is a sectional view looking in the direction of the arrows 4—4 in FIGURE 3.
Figure 5:
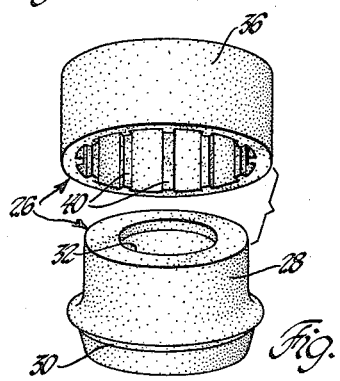
FIGURE 5 is an exploded and perspective view of the two parts of which the drain controller of the present invention is composed.

An automobile 10 is depicted in FIGURE 1 as having a windshield 12 and a cowl air inlet as at 14 as in the case of the patent mentioned above. With the vehicle under way, air from the inlet 14 is forced downwardly by ram effect into the cowl chambers 16 and 18 on opposite sides of the vehicle and as a result, these chambers or compartments serve as catch basins for a considerable amount of moisture which gathers above the bottom walls 20 and 22 of the two chambers. Heretofore, such water would promptly begin to drain out by way of openings in the bottom walls 20 and 22 but as the openings would necessarily be restricted (so not to lose pressure of ventilation air), considerable moisture would be retained in the chambers for some time after the vehicle is parked. As a result, this moisture would continue to run out on the ground or floor and would often be highly objectionable.

With the application of the present invention, however, a controller 26 is installed in each compartment designed to catch rainfall or condensation and as will be understood as the description proceeds, drainage from the compartments is accomplished only when the vehicle is under way.

Each controller 26 is formed of plastic material such as polyethylene. It includes an inner cup 28 bearing a peripheral groove 30 near its bottom edge and having a large opening 32 at one or the top end thereby giving access to a larger and downwardly extending central flow passage 34. The controller 26 also includes an outer and inverted cup 36 bearing radial ribs 38 and inner parallel ribs 40. The outer cup 36 is arranged in coaxial and nested relation with the inner cup 28 and the ribs 38 and 40 serve as spacing elements aiding in defining multiple and upwardly extending passages 42. These flow passages are of restricted flow capacity and extend upwardly and then inwardly to communicate by means of the large top opening 32 of the inner cup 28 with the large central passage 34.

When the vehicle 10 is in operation, the ram effect of the air entering at 14 causes a pressure differential to exist between the interior of each of the chambers 16 and 18 and the atmosphere below the bottom walls 20 and 22. This differential pressure causes the moisture to flow upwardly and then downwardly through each controller 26 and to drain on the ground. If the vehicle is parked, the ram effect and hence the differential pressure ceases to exist and the discharge of moisture will promptly cease. Assuming, of course, that the customary level of water in the compartment being served never rises above the top of the inner cup 28. In an automobile cowl chamber the rise of the water level above the inner cup would be extremely unlikely. No syphon effect will be had because the multiple passages 42 are so restricted in flow capacity in comparison with the discharge capacity of the downwardly inclined flow passage 34.

I claim:

1. A drain controller in combination with a vehicle body, said body including a body chamber having means for receiving air by a ram effect and means for collecting liquid, said liquid collecting means including a horizontal wall defining the bottom of said chamber and an aperture in said wall; said controller comprising an inner member in sealing engagement with the means forming said aperture and including an upwardly extending portion terminating in an upper opening aligned with said aperture; and an outer cup-shaped member having a closed top surface and a downwardly extending portion terminating in a bottom opening, said outer member surrounding and being spaced from said inner member and including liquid inlet means at the bottom opening of said outer member so that a communicating passage is defined by the relatively spaced upwardly extending portion of said inner member and downwardly extending portion of said outer member to connect the bottom of said chamber and the upper opening of said inner member whereby liquid is discharged from said vehicle chamber through said communicating passage and wall aperture upon application of forced air to said chamber.

2. A drain controller in combination with a vehicle body, said body including a body chamber having means for receiving air by a ram effect and means for collecting liquid, said liquid collecting means including a horizontal wall defining the bottom of said chamber and an aperture in said wall; said controller comprising an inner member and an outer member concentrically positioned, said inner concentric member being in sealing engagement with the means forming said aperture and extending upwardly from said aperture and terminating in an upper opening being aligned with said aperture, said outer concentric member having a closed top surface and open bottom and being spaced from said inner member so as to provide a communicating passage between the bottom of said chamber and the upper opening of said inner member, whereby liquid is discharged from said vehicle chamber through said passage and wall aperture upon application of forced air to said chamber.

References Cited by the Examiner

UNITED STATES PATENTS

| 2,011,840 | 8/35 | Arnold | 98—2.1 |
| 2,582,031 | 1/52 | Harbison | 62—289 |
| 2,787,206 | 4/57 | Dustman | 98—2 |

ROBERT A. O'LEARY, *Primary Examiner.*

MEYER PERLIN, *Examiner.*